Nov. 9, 1965 R. C. MOTT 3,216,660
TEMPERATURE CONTROL SYSTEM
Filed June 24, 1963

INVENTOR.
RICHARD C. MOTT
BY Joseph E. Ryan
ATTORNEY

United States Patent Office 3,216,660
Patented Nov. 9, 1965

---

3,216,660
TEMPERATURE CONTROL SYSTEM
Richard C. Mott, Harwood Heights, Ill., assignor to Honeywell Inc., a corporation of Delaware
Filed June 24, 1963, Ser. No. 290,064
8 Claims. (Cl. 236—1)

My invention relates to a temperature control system and more particularly to an improved temperature control system having a simplified summer-winter changeover provision.

Temperature control systems with summer-winter changeover are well recognized, but they normally require auxiliary control equipment, special and complex valving and controllers in order to effect such operation. The present invention is directed to a simplified summer-winter changeover type of temperature control system which utilizes a standard bleed type primary controller, a simplified pneumatic actuator and a dual valve unit which will respond to the simple thermostat in a reverse and direct acting type of operation. The main provision for this type of control is a dual level control air pressure source which is also well recognized for special control purposes. Therefore it is an object of this invention to provide an improved temperature control system utilizing a summer-winter changeover provision. Another object of this invention is to provide a simplified thermostat valve combination in a temperature changing control system capable of providing reverse and direct acting type of operation for summer-winter changeover. Another object of this invention is to provide an improved changeover system requiring a minimum of parts for controllers which are for the most part conventional design and economical to manufacture. These and other objects of this invention will become apparent from reading of the attached description together with the drawings wherein:

Figure 1:
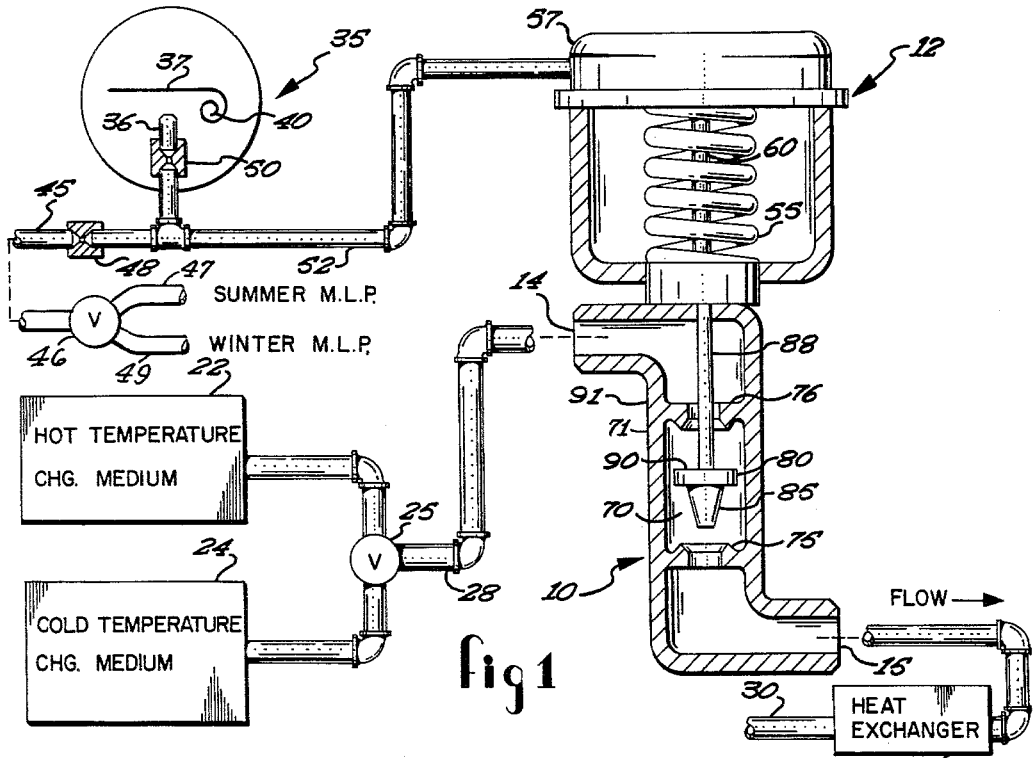
FIGURE 1 is a schematic diagram of the improved temperature control.

The improved temperature control system, shown schematically in FIGURE 1, utilizes basically a simplified valve or valve unit indicated generally at 10 which is controlled or positioned by an actuator 12, the valve unit having a single inlet 14 and outlet port 15 to control flow of the temperature changing medium through a heat exchanger indicated generally in block at 20. A dual temperature source of air conditioning medium indicated in block at 22 and 24 would be connected through a valve 25 and pipe 28 to the inlet port 14. The valve 25 is shown schematically and while it forms no part of the present invention, could be either manually or automatically operated. The dual temperature sources 22, 24 would be either hot water or the equivalent heating medium and cold water or the equivalent cooling medium to be passed through the heat exchanger 20 and controlled by the valve 10. A return line 30 would return the flow of the air conditioning medium after leaving the heat exchanger to the source. The details of the source or sources of temperature changing medium or piping to the valve may be conventional and is shown schematically herein. Actuator 12 is controlled by a simple bleed type pneumatic controller indicated generally at 35 as comprising basically a nozzle 36 and flapper 37 which in turn is controlled by a sensor such as a bimetal 40 adapted to respond to temperature of the space to be air conditioned by the heat exchanger 20. A control air line 45 leading to the primary controller 35 includes a conventional restriction 48 designed to provide a predetermined air flow generally to the control apparatus to maintain the pressure therein. In addition thereto, the primary controller includes a second restriction 50, the purpose of which will be later explained. Branch line pressure established by the bleed at the flapper nozzle 36, 37 configuration will be fed through a branch line conduit 52 to the input of the pneumatic actuator 12 which may be conventional in form. This actuator includes the normal return spring 55 acting against the force generated by the pneumatic pressure in the pressure portion of the actuator indicated schematically by the dome 57 to move an output shaft 60. The valve 10 includes a valve body 71 which is connected to and operated by the actuator 12. Within body 71 is a single passage 70 connecting the inlet and outlet ports 14, 15. Positioned within the valve body 71 defining the passage 70 are a pair of valve seats indicated generally at 75, 76, these valve seats being spaced apart in passage and positioned in opposed relationship, that is the seat faces are positioned toward one another such that they may cooperate with a valve closure member or valve plug 80 positioned therebetween.

As will be seen in the diagram, valve plug 80 has a conical or contoured valve surface 85 designed to co-operate with the valve seat 75 to give a characterized and modulating type of valve operation. It is this valve means or valve element of the composite valve unit 10 which controls on the heating cycle or when the temperature changing medium is hot. The valve plug 80 is carried by an operating shaft 88 which extends through the valve body 71 and is suitably sealed therein through means (not shown). Shaft 88 is connected to the actuator shaft 60 for movement thereby. This actuator shaft 60 is moved downwardly urging the valve operating shaft 88 and the valve plug 80 down into range for operation for the valve parts 85, 75 for the heating cycle under conditions of high pressure applied to the pneumatic or pressure responsive portion 57 of the actuator 12. Thus at the maximum pressure, the valve plug 80 or its surface 85 will engage with the valve seat 75 to close the passage 70 through the valve body 71 on the heating cycle and the reduction of pressure moving the plug 80 away from the valve seat 75 will open this valve portion of the overall valve configuration.

The opposite surface of the valve plug 80 which is shown merely as a circular surface 90 mates with the valve seat 76 in the passage 70 to provide a second valve means as the operating shaft 88 is withdrawn from the valve body upon a reduction in pressure in the motive chamber of the actuator 12. The return spring 55 of the actuator will determine this direction of motion balancing against the force on the pressure responsive portion of 57 of the actuator 12 and a two position type of operation will be obtained with this portion of the valve structure or this valve means to control the flow of a cooling medium from the source 24 through the heat exchanger 20. Although not shown, it will be understood that provision may be made for overtravel of the operating shaft 88 within the valve body 71 by suitably mounting the plug 80 thereon. Thus the actuator 12 and the valve 10 has two ranges of operation, one in which the valve surfaces 75, 85 are operative to control flow through the passage 70 of the valve body 71 which range is the high pressure range for the actuator 12. The other operative range for valve 10 is the low pressure range in which the valve surfaces 90, 76 cooperate to open and close the passage 70 through the valve body 71, this being the low pressure ranges of the actuator. The range of movement of the valve shaft 88 which is attached to or suitably connected to the actuator shaft 60 of the actuator 12 is controlled by a balance of the spring force of return spring 55 and the pressure within the motive chamber 57 of the actuator acting against the same. Thus the magnitude or pressure in the motive chamber will determine the position of the operating shaft 88 within the valve body and hence which of the valves defined above is to be actuated.

This arrangement provides for a simple summer-winter changeover since the valve unit 10 may be operated through the valve parts 75, 85 on the heating cycle in a modulating manner and toward a valve closure position for an increase in pressure in the actuator 57 while at the same time at a lower pressure range may be operated through the cooperation of the valve surfaces 76, 90 in the valve body to control flow through the passage for a cool air conditioning medium with a low pressure applied to the actuator 12 and with the valve parts being directed in a closing direction with a drop in pressure to the actuator 12. The control of the actuator 12 and hence valve unit 10 for these two conditions of operation will be determined by a simple bleed type controller or thermostat 35 which establishes a branch line pressure in the conduit 52 leading to the motive or pressure chamber 57 of the actuator. The two levels of pressures or the two ranges of operation for the pneumatic motor 12 are determined by the main line pressure applied to the inlet conduit 45. This main line pressure for summer operation will be low or as an example 8 p.s.i.g. and for winter operation will be high, as for example 18 p.s.i.g. applied thereto. This would be accomplished by a single changeover valve 46 supplied from a summer branch line pressure source 47 and a winter branch line pressure source 49. The normal restriction 48 will provide a constant pressure to the control system in a conventional manner and the additional restriction 50 included in the controller 35 or associated therewith will be so sized so as to limit the bleeding or drop in pressure through the flapper 37 nozzle 36 configuration of the controller to prevent the branch line pressure in conduit 52 from entering into the low pressure range when high pressure main air is applied hereto. Thus, for example, with 18 p.s.i.g. applied to the inlet of control pipe 45, the thermostat or primary controller 35 in response to a drop in temperature as sensed by its sensing element or bimetal 40 will open allowing the branch line pressure in the conduit 52 to drop. The restriction 50 positioned in the nozzle will effect or limit the drop of the high pressure applied thereto so that branch line pressure will not fall below a predetermined point, as for example 8 p.s.i.g. under which conditions the heating valve or the valve parts 75, 85 will be in a maximum open position intermediate the valve seats 76, 75. Further its presence with the lower control air pressure permits the flapper nozzle to operate only in the lower control pressure range.

Figure 2:
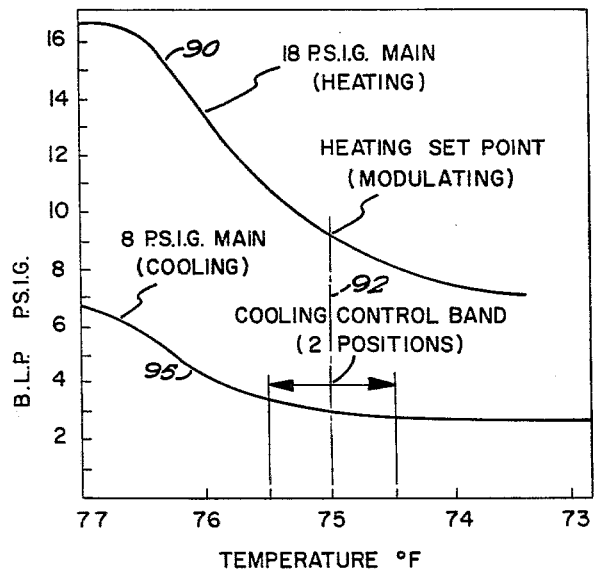
FIGURE 2 is a graph of the operation of the apparatus relating branch line pressure to the pneumatic actuator operating the valve relative to temperature as a condition sensed by the primary controller or thermostat.

As will be seen in FIGURE 2, this operation is disclosed graphically so that upon the heating cycle as indicated by the curve 90, a room temperature as sensed by the bimetal 40 in the range of 77 degrees Fahrenheit or above will provide the maximum pressure to the actuator 12 limiting the valve to a full closed position. A drop in temperature will reduce the branch line pressure to approximately 8 p.s.i.g. branch line pressure in the vicinity of about 73 to 74 degrees Fahrenheit. This curve slopes to provide a modulating type of operation over the desired control range of approximately 1° to either side of a reference temperature indicated by the line 92 on the graph at 75° F. to provide the modulating type of operation for the valve.

With the change of summer main line control air pressure of 8 p.s.i., the thermostat or primary controller 35 will vary the branch line pressure in the conduit 52 as outlined by the curve 95 from approximately 7 p.s.i. through 3 p.s.i.g. for the cooling operation of the heat exchanger, opening and closing of the valve surfaces 76, 90 of the second valve means in a two position type of operation. The change in the slope of the curve 95 to the side of the reference or set point temperature 75 is relatively flat and the small change in pressure will be sufficient to open and close the valve 76, 90 to permit flow through the passage 70 of the valve 10.

Thus it will be seen that with a simple or conventional pneumatic actuator, a simplified pneumatic control circuit and the addition of a restriction in a simple bleed type controller or thermostat, a dual valve unit may be employed for summer-winter changeover without requiring change in the thermostat or additional thermostats for control purposes. Similarly, the action of the thermostat on the actuator 12 will be reversed for the heating and cooling cycles since the drop in temperature as indicated on the graph between 77 and 73 degrees will change the control pressure in the branch line 52 to the actuator 12 in such a direction that the valve for the cooling cycle will be moved from open to closed position as distinguished from movement in a closing direction on the heating cycle for a similar drop in temperature. This provides a simplified apparatus which is largely conventional to provide for a summer-winter changeover system in which only a change in control air pressure and a change in the supply lines to the heat exchanger and a control valve is required.

In considering this invention it should be remembered that the present disclosure is intended to be illustrative and the scope of the invention should be determined only by the appended claims.

I claim as my invention:

1. A temperature control system for controlling the flow of an air conditioning medium through a heat exchanger comprising, a valve having a single inlet and a single outlet port with a single passage through the valve body, means adapted to connect said valve to a source of air conditioning medium, means adapted to connect the outlet port of said valve through said heat exchanger, said valve means including a pair of valve seats positioned in said passage and being disposed in opposed relationship to one another, a single valve closure member having surfaces adapted to mate with said opposed valve seats on opposite faces of said valve closure member to provide a pair of valves in series through said passage, an operating shaft mounting said valve closure member and extending into said valve body and being adapted to move said valve closure member into opening or closing positions with respect to each of said valve seats depending upon the extent of movement of said operating shaft, a pneumatic actuator attached to said operating shaft adapted to move said operating shaft and said valve closure member to operate in engagement with either of said valve seats, a control air source for said pneumatic actuator including a first restriction and having two pressure levels for control purposes, a primary controller of the bleed type connected to said source and including a branch line passage to said actuator, said primary controller including a second restriction limiting the pressure drop at the controller and hence the operating range of said pneumatic actuator for one of said control pressure levels of said source such that it does not enter the operating range of said primary controller for the other of said control pressure levels of said source whereby said valve actuator operates in the range of one of said valves for opening and closing the same for one control pressure level and operates the second of said valves in said valve body for the second range of control air pressure.

2. A temperature control system for controlling the flow of an air conditioning medium through a heat exchanger comprising, a valve having a single inlet and a single outlet port with a single passage through the valve body, means adapted to connect said valve to a source of air conditioning medium having two different temperature levels for heating and cooling respectively, means connecting the outlet port of said valve to said heat exchanger, said valve means including a pair of valves in series through said passage and operated by a common valve closure means, an operating shaft mounting said valve closure means and extending into said valve body and being adapted to move said valve closure means into opening or closing positions with respect to each of said valves depending upon the extent of movement of said operating shaft, a pneumatic actuator attached to said operating shaft adapted to move said operating shaft and said valve closure means to operate each of said valves, a control air source for said pneumatic actuator including a first restriction and having two pressure levels for control purposes, a primary controller of the bleed type connected to said source and including a branch line passage to said actuator, said primary controller including a second restriction limiting the pressure drop at the controller and hence the operating range of said pneumatic actuator for one of said control pressure levels of said source such that it does not enter the operating range of said primary controller for the other of said control pressure levels of said source whereby said valve actuator operates one of said valves opening and closing the same for one control pressure level and operates the second of said valves in said valve means for the second range of control air pressure.

3. A temperature control system for controlling the flow of an air conditioning medium through a heat exchanger comprising, a valve means having an inlet and outlet port with a single passage through the valve body, means adapted to connect said valve to a two temperature source of air conditioning medium which is selectively connected to said valve means, means connecting the outlet port of said valve means to said heat exchanger, said valve means including a pair of valve seats positioned in said passage and being disposed in opposed relationship to one another, a single valve closure member adapted to mate with said opposed valve seats to provide a pair of valves in said passage, an operating shaft mounting said valve closure member being adapted to move said valve closure member into opening or closing positions with respect to each of said valve seats depending upon the extent of movement of said operating shaft, a pneumatic actuator attached to said operating shaft adapted to move said operating shaft and said valve closure member into engament with either of said valve seats, a control air source for said pneumatic actuator including a first restriction and having two pressure levels for control purposes, a primary controller of the bleed type connected to said source and including a branch line passage connected to said actuator, said primary controller including a second restriction limiting the pressure drop at the controller whereby said valve actuator operates in the range of one of said valves for opening and closing the same for one control pressure level and operates the second of said valves in said valve body for the second range of control air pressure.

4. A temperature control system comprising, a valve unit including a dual valve in series therein, each valve of said dual valve being adapted to be operated by a common operating shaft selectively for different ranges of movement of the operating shaft, said valve unit being adapted to be selectively connected to different temperature sources of air conditioning medium and adapted to control flow of said medium through a heat exchanger for temperature control purposes, pneumatic motive means connected to and operating the operating shaft of said valve unit to selectively open or close each of said valve means for different ranges of linear movement of said motive means, a bleed type thermostat including a single flapper nozzle for controlling said motive means, a dual level control air source including restriction means connected to said bleed type thermostat and including additional connection means to said motive means to provide a passage for a control branch pressure from said thermostat as determined by said flapper and nozzle, said restriction means and a restriction in said nozzle cooperating with the higher of said control pressures from said source to restrict the branch line pressure to a range in which the motive means opens and closes only one of said valve means, said restriction means and said restriction being operative at the lower of said control air pressures from said source to restrict movement of said actuator to opening and closing movements of the other of said valve means.

5. A temperature control system with summer-winter changeover comprising, a valve unit including a dual valve means in series therein, each valve of said valve means being connected to be operated by a common operating shaft selectively for different ranges of movement of the operating shaft, said valve unit being adapted to be selectively connected to different temperature sources of air conditioning medium and adapted to control flow of said medium through a heat exchanger for temperature control purposes, pneumatic actuator means connected to and operating the operating shaft of said valve unit to selectively open or close each of said valve means for different ranges of linear movement of said actuator means, a bleed type thermostat including a single flapper nozzle for controlling said motive means, a high and low pressure control air source having restriction means for summer-winter changeover connected to said bleed type controller and including additional connection means to said actuator means to provide a passage for a control branch pressure from said controller as determined by said flapper and nozzle, said restriction means and a restriction in said nozzle cooperating with the higher of said control pressures from said source to restrict the branch line pressure to a range in which the motive means opens and closes only one of said valve means, said restriction means and said restriction being operative at the lower of said control air pressures from said source to restrict movement of said actuator to opening and closing movements of the other of said valve means.

6. A temperature control system with summer-winter changeover comprising, a valve unit including a dual valve means in series therein, each valve of said valve means being connected to be operated by a common operating shaft selectively for different ranges of movement of the operating shaft, said valve unit being adapted to be selectively connected to different temperature sources of air conditioning medium and adapted to control flow of said medium through a heat exchanger for temperature control purposes, pneumatic actuator means connected to and operating the operating shaft of said valve unit to selectively open or close each of said valve means for different ranges of movement of said actuator means, a bleed type controller for controlling said actuator means, a high and low pressure control air source having restriction means connected to said bleed type controller and including additional connection means to said actuator means to provide a passage for a control branch pressure from said controller as determined by a condition which it is adapted to sense, and said restriction means and a restriction in said controller cooperating with the higher of said control pressures from said source to restrict the branch line pressure to a range in which the actuator means opens and closes only one of said valve means.

7. A temperature control system for controlling the flow of an air conditioning medium through a heater exchanger comprising, a valve having a single inlet and a single outlet port with a single passage therethrough, means for connecting said valve to a dual temperature source of air conditioning medium, means connecting the outlet port and valve through said heat exchanger, said valve including a pair of valve seats positioned in said passage and being disposed in opposed relationship to one another, a single valve closure member having surfaces adapted to engage selectively said opposed valve seats on opposite faces of said valve closure member to provide a pair of valve means in series through said passage, an operating shaft mounting said valve closure member and extending into said valve and being adapted to move said valve closure member into opening or closing positions with respect to each of said valve seats depending upon the extent of movement of said operating shaft, a pneumatic actuator attached to said operating shaft adapted to move said operating shaft and said valve closure member to operate in engagement with each of said valve seats, a control air source for said pneumatic actuator including a first restriction having two pressure levels for control purposes, a primary controller of the bleed type connected to said source and including a branch line passage to said actuator, said primay controller including a second restriction limiting the pressure drop at the controller and hence the operating range of said pneumatic actuator for one of said control pressure levels of said source such that it does not enter the operating range of said primary controller for the other of said control pressure levels of said source whereby said valve actuator moves the valve closure member with respect to one of said valve seats for opening and closing the passage and moves the valve closure member with respect to the second of said valve seats for opening and closing said passage for the second range of control air pressure, said two level control air pressures and said pair of valve means being so related that for a given change in condition sensed by said primary controller the operation of said actuator on said valve will be in opposite directions with respect to each of said valve seats to give reverse acting and direct acting type of valve operation for summer-winter changeover.

8. A temperature control system for controlling the flow of an air conditioning medium through a heater exchanger comprising, a valve including a valve housing having a single inlet and a single outlet port with a single passage therethrough, means for connecting said valve to a dual temperature source of air conditioning medium, means connecting the outlet ports and valve through said heat exchanger, said valve including a pair of valve seats positioned in said passage and offset from one another, a single valve closure member having surfaces adapted to engage selectively said valve seats to provide a pair of valve means in series through said passage, an operating shaft mounting said valve closure member and extending into said valve housing being adapted to move said valve closure member into opening or closing positions with respect to each of said valve seats depending upon the extent of movement of said operating shaft, a pneumatic actuator attached to said operating shaft adapted to move said operating shaft and said valve closure member to operate in engagement with each of said valve seats, a control air source for said pneumatic actuator including a first restriction having two pressure levels for control purposes, a primary controller of the bleed type connected to said source and including a branch line passage to said actuator, said primary controller including a second restriction limiting the pressure drop at the controller and hence the operating range of said pneumatic actuator for one of said control pressure levels of said source such that it does not enter the operating range of said primary controller for the other of said control pressure levels of said source whereby said valve actuator moves the valve closure member with respect to one of said valve seats for opening and closing the passage and moves the valve closure member with respect to the second of said valve seats for opening and closing said passage for the second range of control air pressure, said two control air pressure levels and said pair of valve seats being so related that for a given change in condition sensed by said primary controller the operation of said actuator on said valve will be in opposite directions with respect to each of said valve seats to give reverse acting and direct acting type of valve operation for summer-winter changeover.

References Cited by the Examiner

UNITED STATES PATENTS

| 2,539,194 | 1/51 | Knaus | 256—1 |
| 2,747,800 | 5/56 | Mosely | 236—1 |

EDWARD J. MICHAEL, *Primary Examiner.*